United States Patent
Kuo et al.

(10) Patent No.: US 8,866,988 B2
(45) Date of Patent: Oct. 21, 2014

(54) FRAME FOR LCD DEVICE AND LCD DEVICE

(75) Inventors: Yicheng Kuo, Shenzhen (CN); Shihhsiang Chen, Shenzhen (CN); Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 128 days.

(21) Appl. No.: 13/504,033

(22) PCT Filed: Mar. 29, 2012

(86) PCT No.: PCT/CN2012/073215
§ 371 (c)(1),
(2), (4) Date: Apr. 25, 2012

(87) PCT Pub. No.: WO2013/143092
PCT Pub. Date: Oct. 3, 2013

(65) Prior Publication Data
US 2013/0258229 A1   Oct. 3, 2013

(30) Foreign Application Priority Data
Mar. 27, 2012   (CN) .......................... 2012 1 0083551

(51) Int. Cl.
*G02F 1/1333*   (2006.01)

(52) U.S. Cl.
USPC ........................................................... 349/58

(58) Field of Classification Search
CPC ............ G02F 1/133308; G02F 1/1333; G02F 1/133615; G02F 1/133608; G02F 1/1335; G02F 2201/46; G02F 2201/465; G02F 2001/133314; G02F 2001/133317; G02F 2001/133311; G02F 2001/13332; G02F 2001/133322; G02F 1/157; H05K 2201/09081; H05K 5/0004; H05K 5/0052; H05K 7/18; H05K 9/0007; H05K 9/0047; F21V 21/0808; F21V 21/14; F21V 3/04; F21V 15/01; A47F 3/043; A61B 1/00147
USPC .......... 361/679.27, 679.41, 679.56, 752, 600, 361/725, 730, 796, 807; 349/58, 60, 122, 349/65; 312/223.2, 223.1; 362/97.1, 382, 362/581, 634, 249.01; 348/E5.128, 790, 348/836, 843; 29/856; 49/501
See application file for complete search history.

(56) References Cited

U.S. PATENT DOCUMENTS

| 5,764,200 A * | 6/1998 | Odmark ........................ 345/1.1 |
| 7,936,416 B2 * | 5/2011 | Huang et al. .................... 349/58 |
| 2010/0080020 A1 | 4/2010 | Lin et al. |
| 2010/0164859 A1 * | 7/2010 | Huang ........................... 345/102 |
| 2010/0182756 A1 * | 7/2010 | Tochi et al. ................... 361/752 |
| 2011/0134661 A1 * | 6/2011 | Cheng et al. .................. 362/615 |
| 2013/0077016 A1 * | 3/2013 | Zhang ............................ 349/58 |

FOREIGN PATENT DOCUMENTS

| CN | 2671078 Y | 1/2005 |
| CN | 2844971 Y | 12/2006 |
| CN | 201637970 U | 11/2010 |

OTHER PUBLICATIONS

Duan Keyu, the International Searching Authority written comments, Jan. 2013, CN.

* cited by examiner

*Primary Examiner* — Thoi Duong
(74) *Attorney, Agent, or Firm* — IPro, Inc.; Na Xu

(57) ABSTRACT

The invention relates to the field of LCDs, and more particularly to a frame for an LCD device and an LCD device comprising the frame. The frame for an LCD device includes an extrusion made of plastic material, and the extrusion forms the rims of the frame after being bent. The frame for an LCD device of the invention is made of plastic material and comprises an extrusion made of plastic material. The extrusion forms the rims of the frame after being bent. By using the characteristics that the shape of the cross section of the extrusion is fixed, but the length is not limited basically, the extrusions is cut into corresponding length after determining the size of the frame, and then the rims of the frame are partially or totally formed by bending the extrusion. The extrusions with the cross sections of the same shape can be made into frames of any size. Because the sharing performance of extrusion dies is improved, and the number of special purpose dies is reduced, thus the cost of frames is further reduced, and then the development cycle of LCD devices is shortened.

4 Claims, 2 Drawing Sheets

FRAME FOR LCD DEVICE AND LCD DEVICE

TECHNICAL FIELD

The invention relates to the field of liquid crystal displays (LCDs), and more particularly to a frame for an LCD device and an LCD device.

BACKGROUND

As shown in FIG. 1, a conventional LCD device generally includes a front frame 1, an LCD panel 2, a middle frame 3, a backlight module 4, a back cover 5 and the like. The backlight module 4 includes an optical film, a light guide panel, a lightbar and the like. Wherein, the front frame 1, the middle frame 3 and the back cover 5 respectively have different functions; the front frame 1 is mainly used for fixing the LCD panel 2 and preventing the LCD panel 2 from escaping, the middle frame 3 is mainly used for bearing the LCD panel 2 and shielding partial backlight module 4 from light leakage, and the back cover 5 is mainly used for bearing the optical film, the light guide panel, the lightbar and the like and ensuring the planeness of the backlight module 4.

The middle frame of the LCD device in the prior art is mainly made of plastic material, and the front frame and the back cover are mainly made of metal material. To reduce cost, partial front frame and back cover are made of plastic material instead of metal material. The back cover is divided into a back frame and a bottom plate, and the back frame and the bottom plate are separately made and then integratedly assembled. When the aforementioned front frame, middle frame and back frame are made of plastic material, the main molding method is integrated injection molding. However, because LCD devices have different sizes, the aforementioned frames need to have different sizes correspondingly. Special dies should be developed for all the frames. Because the dies have the characteristics of non-sharing, long manufacturing cycle and high cost, further reduction of the cost of the aforementioned frames and further shortening of the development cycle of LCD devices are limited, thereby demanding prompt solution.

SUMMARY

In view of the above-described problems, the aim of the invention is to provide a frame for an LCD device and an LCD device comprising the frame with advantages of short development cycle and low cost.

A first technical scheme of the invention is that: an LCD device comprises a frame; the frame comprises an extrusion made of plastic material, and the extrusion forms the rims of the frame after being bent. The extrusion comprises a vertical edge and a horizontal edge; the horizontal edge is provided with notches, and the extrusion is bent at the notches. After the extrusion is bent, the plane of the frame is in parallel with the plane of the horizontal edge. The cross section of the extrusion is in a T or L shape, the extrusion comprises three notches which divide the extrusion into four sections, and the extrusion forms the four rims of the frame end to end after being bent. Both ends of the extrusion are connected by mucilage glue or ultrasonic welding. The notches are in a shape of an isosceles triangle with a vertex angle of 45°, the angel near the vertical edge is the vertex angle, the horizontal edge(s) at the head-tail ends of the extrusion is provided with chamfer(s), the angle of the chamfer is 45°, the edge length of the chamfer is the width of the horizontal edge, and the frame is a front frame, a middle frame or a back frame.

A second technical scheme of the invention is that: a frame for an LCD device comprises an extrusion made of plastic material, and the extrusion forms the rims of the frame after being bent.

Preferably, the extrusion comprises a vertical edge and a horizontal edge; the horizontal edge is provided with notches, the extrusion is bent at the notches, and the plane of the frame is in parallel with the plane of the horizontal edge after the extrusion is bent. Because the horizontal edge is provided with the notches, the horizontal edge does not need bending as long as the vertical edge is bent when bending the extrusion; thus, bending becomes easy, the extrusion is not easy to fracture, and the planeness of the frame is easier to control.

Preferably, the cross section of the extrusion is in a T or L shape. The extrusion with a T-shaped cross section is suitable for making a middle frame, and the extrusion with an L-shaped cross section is suitable for making a front frame or a back frame.

Preferably, the extrusion comprises three notches which divide the extrusion into four sections, and the extrusion forms the four rims of the frame end to end after being bent. Therefore, the cost of the frame can be reduced to a maximum extent.

Preferably, the head-tail ends of the extrusion are connected by mucilage glue or ultrasonic welding, which is easy to operate and is firm and reliable.

Preferably, the notches are in a shape of an isosceles triangle with a vertex angle of 45°, and the angle near the vertical edge is the vertex angle. Thus, after the extrusion is bent, the adjacent horizontal edges are mutually butted and have no interference, thereby preferably ensuring the strength of the frame.

Preferably, the horizontal edge(s) at the head-tail ends of the extrusion is provided with chamfer(s).

Preferably, the angle of the chamfer is 45°, and the edge length of the chamfer is the width of the horizontal edge. Thus, after the extrusion is bent, the adjacent horizontal edges are mutually butted and have no interference, thereby preferably ensuring the strength of the frame.

Preferably, the frame is a front frame, a middle frame or a back frame.

The invention further provides a third technical scheme: an LCD device comprises a frame; the frame comprises an extrusion made of plastic material, and the extrusion forms the rims of the frame after being bent.

Preferably, the extrusion comprises a vertical edge and a horizontal edge, the horizontal edge is provided with notches, the extrusion is bent at the notches, and the plane of the frame is in parallel with the plane of the horizontal edge after the extrusion is bent. Because the horizontal edge is provided with the notches, the horizontal edge does not need bending as long as the vertical edge is bent when bending the extrusion; thus, bending becomes easy, the extrusion is not easy to fracture, and the planeness of the frame is easier to control.

Preferably, the cross section of the extrusion is in a T or L shape. The extrusion with a T-shaped cross section is suitable for making a middle frame, and the extrusion with an L-shaped cross section is suitable for making a front frame or a back frame.

Preferably, the extrusion comprises three notches which divide the extrusion into four sections, and the extrusion forms the four rims of the frame end to end after being bent. Therefore, the cost of the frame can be reduced to a maximum extent.

Preferably, the head-tail ends of the extrusion are connected by mucilage glue or ultrasonic welding, which is easy to operate and is firm and reliable.

Preferably, the notches are in a shape of an isosceles triangle with a vertex angle of 45°, and the angle near the vertical edge is the vertex angle; thus, after the extrusion is bent, the adjacent horizontal edges are mutually butted and have no interference, thereby preferably ensuring the strength of the frame.

Preferably, the horizontal edge(s) at the head-tail ends of the extrusion is provided with chamfer(s).

Preferably, the angle of the chamfer is 45°, the edge length of the chamfer is the width of the horizontal edge; thus, after the extrusion is bent, the adjacent horizontal edges are mutually butted and have no interference, thereby preferably ensuring the strength of the frame.

Preferably, the frame is a front frame, a middle frame or a back frame.

Advantages of the invention are summarized below: by research, the applicant finds that although LCD devices have different sizes, and the frames of the LCD devices have different sizes correspondingly, the shapes of the cross sections of the frames are the same basically. The frame for an LCD device of the invention is made of plastic material and comprises an extrusion made of plastic material. The extrusion forms the rims of the frame after being bent. By using the characteristics that the shape of the cross section of the extrusion is fixed, but the length is not limited basically, the extrusion is cut into corresponding length after determining the size of the frame, and then the rims of the frame are partially or totally formed by bending the extrusion. The extrusions with the cross sections of the same shape can be made into frames of any size. Because the extrusions of the same cross section can share a set of extrusion die, the sharing performance is improved, and the number of special purpose dies is reduced, thus, the cost of frames is further reduced, and then the development cycle of LCD devices is shortened.

Wherein: 1. front frame; 2. LCD panel; 3. middle frame; 4. backlight module; 5. back cover; 6. extrusion; 61. vertical edge; 62. horizontal edge; 63. notch; 64. chamfer.

DETAILED DESCRIPTION

Figure 1:
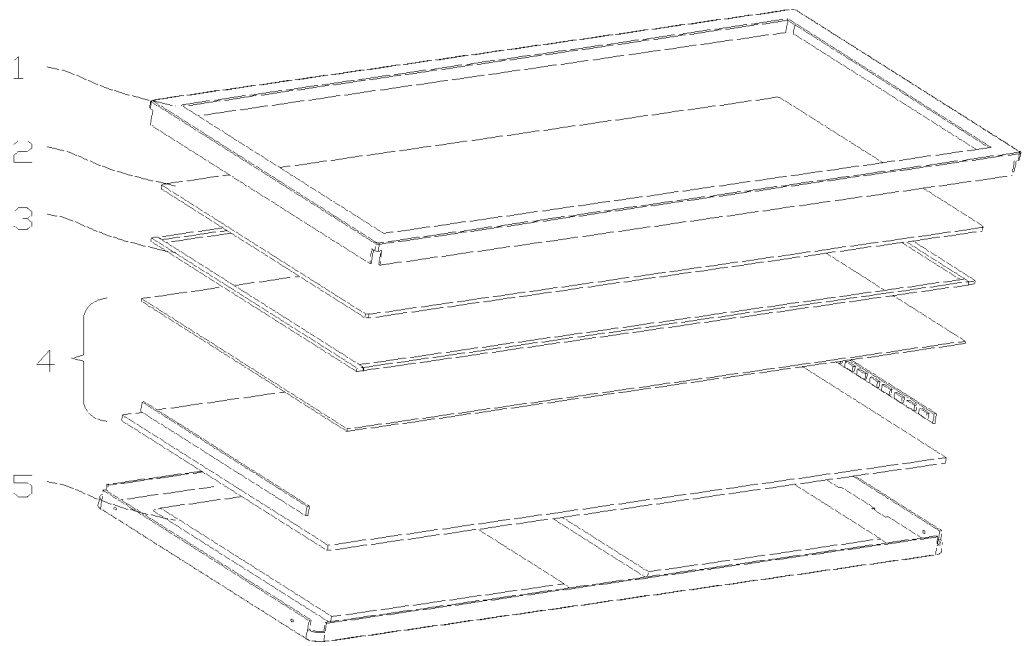
FIG. 1 is a structure diagram of an LCD device in the prior art.
Figure 2:
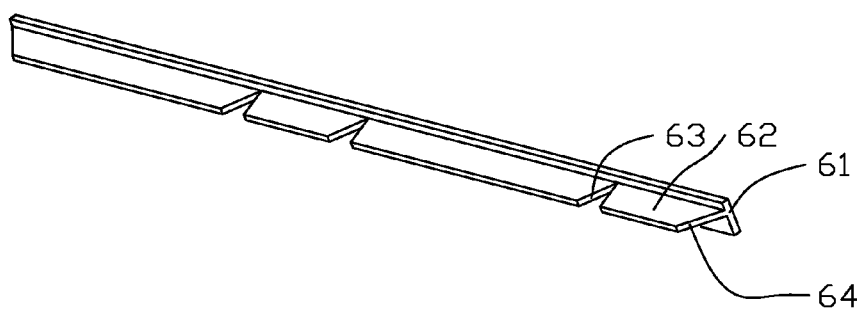
FIG. 2 is a structure diagram of a first example of a frame for an LCD device of the invention.
Figure 3:
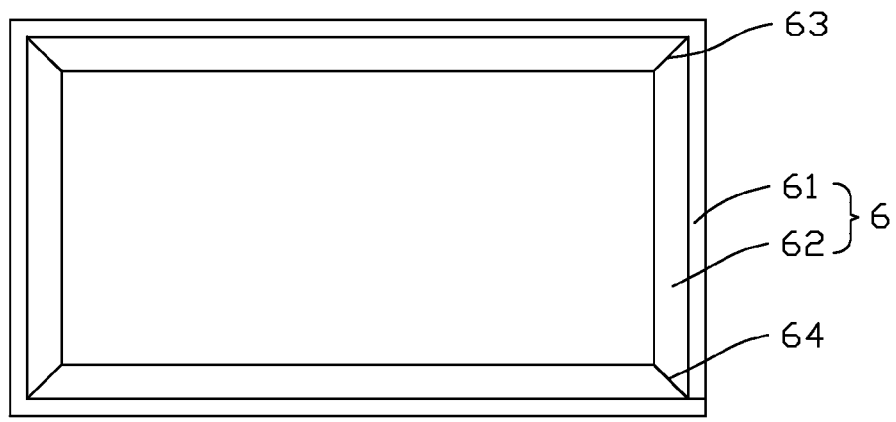
FIG. 3 is a structure diagram of an extrusion of a first example of a frame for an LCD device of the invention.

The invention provides an LCD device comprising a frame; the frame can be a front frame, a middle frame or a back frame. FIG. 2 and FIG. 3 show a first example of the frame for an LCD device of the invention. The frame for an LCD device comprises an extrusion 6 made of plastic material, and the extrusion 6 forms the rims of the frame after being bent.

By research, the applicant finds that although LCD devices have different sizes, and the frames of the LCD devices have different sizes correspondingly, the shapes of the cross sections of the frames are the same basically. The frame for an LCD device of the invention is made of plastic material and comprises an extrusion 6 made of plastic material; the extrusion 6 forms the rims of the frame after being bent. By using the characteristics that the shape of the cross section of the extrusion 6 is fixed, but the length is not limited basically, the extrusion 6 is cut into corresponding length after determining the size of the frame, and then the rims of the frame are partially or totally formed by bending the extrusion 6. The extrusions 6 with the cross sections of the same shape can be made into frames of any size. Because the extrusions of the same cross section can share a set of extrusion die, the sharing performance is improved, and the number of special purpose dies is reduced, thus the cost of frames is further reduced, and then the development cycle of LCD devices is shortened.

In the example, the extrusion 6 comprises a vertical edge 61 and a horizontal edge 62; the cross section of the extrusion 6 is in a specific T shape; the horizontal edge 62 is provided with notches 63. In the example, the specific number of the notches 63 is three, and the three notches 63 divide the extrusion 6 into four sections. The extrusion 6 is bent at the notches 63, the plane of the frame is in parallel with the plane of the horizontal edge 62 after the extrusion is bent, namely, the vertical edge 61 forms the main body of the frame, and the horizontal edge 62 forms the bearing surface of the component; meanwhile, the strength of the frame is enhanced so that the frame is not easy to become deformed. Because the extrusion 6 of the invention is made of plastic material and is different from the metal profile with good ductibility, the extrusion 6 will be fractured if being bent directly, especially the extrusion 6 with a horizontal edge 62 is easier to fracture; furthermore, the planeness of the frame after the extrusion is bent is poor and is not easy to control; in the example, because the horizontal edge 62 is provided the notches 63, the horizontal edge 62 does not need bending as long as the vertical edge 61 is bent when bending the extrusion 6; thus, bending becomes easy, the extrusion 6 is not easy to fracture, and the planeness of the frame is easier to control. The extrusion 6 forms the four rims of the frame end to end after being bent, and specifically, the head-tail ends of the extrusion are connected by mucilage glue or ultrasonic welding, which is easy to operate and is firm and reliable.

In the example, the notches 63 are in a shape of an isosceles triangle with a vertex angle of 45°, and the angle near the vertical edge 61 is the vertex angle; thus, after the extrusion 6 is bent, the adjacent horizontal edges 62 are mutually butted and have no interference, thereby preferably ensuring the strength of the frame; the horizontal edge(s) 62 at the head-tail ends of the extrusion 6 is provided with chamfer(s) 64; preferably, the angle of the chamfer 64 is 45°, and the edge length of the chamfer 64 is the width of the horizontal edge 62; thus, the chamfer 64 is also arranged for the aim that the adjacent horizontal edges are mutually butted and have no interference, thereby preferably ensuring the strength of the frame.

Optionally, in the example, the extrusion can only form two or three rims of the frame, the rest rims are integratedly connected by assembling to form the frame. The frame in the example is inferior to the aforementioned frame with four rims formed by bending the extrusion in the aspects of cost reduction, etc., but superior to the design scheme of the frame which is integratedly injection molded in the prior art.

Figure 4:
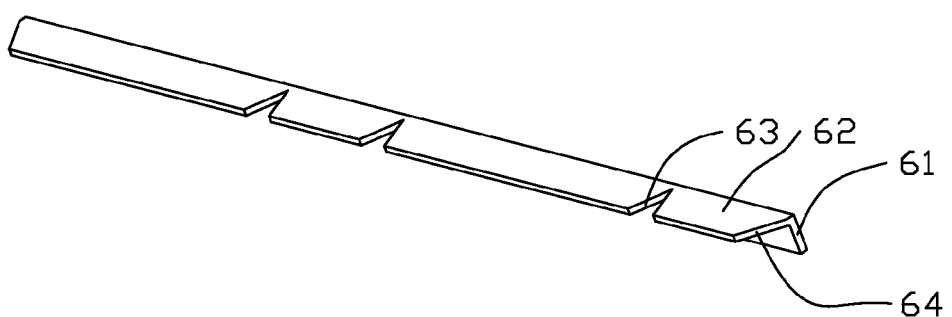
FIG. 4 is a structure diagram of an extrusion of a second example of a frame for an LCD device of the invention.

FIG. 4 shows a second example of the frame for an LCD device of the invention. The second example is different from the first example in the shape of cross sections of the extrusion; the cross section in the second example is in an L shape. The extrusion with a T-shaped cross section is suitable for making a middle frame, and the extrusion with an L-shaped cross section is suitable for making a front frame or a back frame. The rest structures and advantages are the same as the first example; thus, the example will not give unnecessary details.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. A frame for an LCD device, comprising: an extrusion made of plastic material; wherein said extrusion forms the rims of said frame after being bent, said extrusion comprises a vertical edge, and a horizontal edge; said horizontal edge is provided with notches, said extrusion is bent at said notches, and the plane of said frame is in parallel with the plane of said horizontal edge after the extrusion is bent;

said extrusion comprises three notches; said three notches divide said extrusion into four sections, and said extrusion forms the four rims of said frame end to end after being bent; the horizontal edge(s) at the head-tail ends of said extrusion is provided with chamfer(s).

2. The frame for an LCD device of claim 1, wherein the angle of said chamfer is 45°, and the edge length of said chamfer is the width of said horizontal edge.

3. An LCD device, comprising: a frame; wherein said frame comprises an extrusion made of plastic material, and said extrusion forms the rims of said frame after being bent; said extrusion comprises a vertical edge, and a horizontal edge; said horizontal edge is provided with notches, said extrusion is bent at said notches, and the plane of said frame is in parallel with the plane of said horizontal edge after the extrusion is bent; said extrusion comprises three notches; said three notches divide said extrusion into four sections, and said extrusion forms the four rims of said frame end to end after being bent; the horizontal edge(s) at the head-tail ends of said extrusion is provided with chamfer(s).

4. The frame for an LCD device of claim 3, wherein the angle of said chamfer is 45°, and the edge length of said chamfer is the width of said horizontal edge.

* * * * *